UNITED STATES PATENT OFFICE.

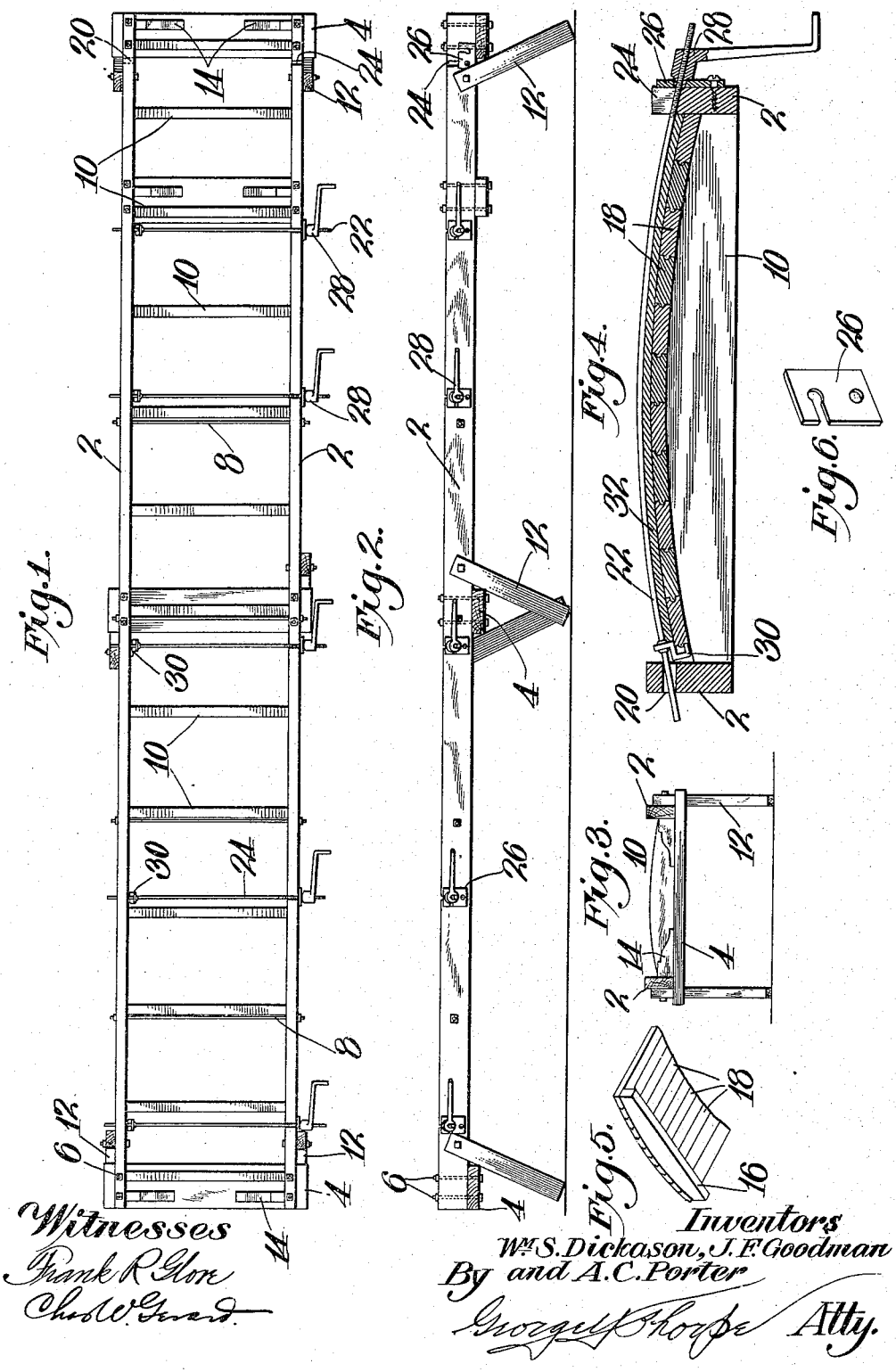

ARTHUR C. PORTER, OF TULSA, OKLAHOMA, AND JAMES F. GOODMAN AND WILLIAM S. DICKASON, OF KANSAS CITY, MISSOURI.

APPARATUS FOR CONSTRUCTING SILO-SECTIONS.

1,174,276. Specification of Letters Patent. Patented Mar. 7, 1916.

Application filed October 20, 1913. Serial No. 796,367.

*To all whom it may concern:*

Be it known that we, ARTHUR C. PORTER, residing at Tulsa, county of Tulsa, State of Oklahoma, and JAMES F. GOODMAN and WILLIAM S. DICKASON, both residing at Kansas City, county of Jackson, State of Missouri, citizens of the United States, have invented certain new and useful Improvements in Apparatus for Constructing Silo-Sections, of which the following is a specification.

This invention relates to apparatus for constructing silo sections, and has particular reference to an apparatus for use in making a silo section out of tongue-and-grooved material of the character illustrated and described in our co-pending application filed concurrently herewith.

Our object is to provide an apparatus which will facilitate the proper assembling of the parts of these silo sections and holding the same while being secured permanently together.

It is also our object to produce a simple and efficient construction which may be readily carried from place to place.

With these objects in view, the invention consists in certain novel and peculiar features of construction and organization as hereinafter described and claimed; and in order that it may be fully understood reference is to be had to the accompanying drawing, in which—

Figures 1, 2 and 3 are plan, side and end views respectively, of an apparatus embodying our invention. Fig. 4, is a transverse section through the apparatus and showing the parts of the silo section in clamped position. Fig. 5, is a perspective view of one end portion of a silo section of the type produced in our apparatus. Fig. 6, is a perspective view of a detail hereinafter referred to.

Referring to the drawing, the apparatus comprises a framework, composed of a pair of longitudinal members 2, spaced apart by the cleats 4, to which they are securely fastened by the bolts 6, said longitudinal members being also connected by a series of cross rods 8 and transverse stave-supporting members 10 having curved supporting surfaces corresponding to the curvature of the silo section which it is desired to produce (see Figs. 3 and 4). The frame is supported upon a plurality of legs 12 which are pivoted to the members 2 and adapted when in supporting position to be braced against the ends of the cleats 4.

Each of the end cleats 4 carries a pair of blocks 14 spaced sufficiently from the end supporting members 10 to accommodate a cleat 16 which is to be secured to the ends of the staves 18 of the silo section being produced. One of the longitudinal members is also provided with a series of openings 20 for receiving the ends of a series of clamping rods 22, the other ends of which are received in a series of notches 24 in the other member 2 and held therein by means of a series of latch plates 26 (see Fig. 6) pivotally mounted adjacent said notches. Each of these latch plates engages a nipple formed on one end of the crank nut 28 which fits the adjacent threaded end of a corresponding rod 22, the nipple being provided on the nut to prevent mutilation of the threads of the rod by the latch plate which holds the rod curved into an outline corresponding to the curvature of the members 10. The opposite end of each rod carries a hook 30 for engaging the tongue on one of the staves 18, said hooks being swaged or otherwise rigidly fixed to the rods 22.

In operation the cleats 16 are placed in position between the ends supporting members 10 and blocks 14 and a series of staves 18 corresponding in length to the members 2 are matched together upon the supporting members 10 and the cleats 16, this being done before the rods 22 are placed in position. A cross piece 32 is then placed across the staves between each of the openings 20 and the opposite notches 24. The rods 22 are then inserted in the openings 20 and the hooks 30 engaged with the tongue of the adjacent stave, the rods lowered into place upon the cross members 32, the crank nuts 28 screwed up on the rods and then the latch plates are thrown into position. The crank nuts are then given several more turns to draw up the rods 22 which are prevented from turning both by friction and by the engagement of the hooks 30 with the stave 18. This drawing up of the rods insures the intimate matching of the staves in position upon the cleats 16 to which they are finally secured by screws or equivalent fastening means.

The staves are further bound together by band sections (not shown, but illustrated in the co-pending application above referred to) and then sawed off to an even length after which the rods 32 are unclamped and the completed silo section removed.

From the foregoing it will be apparent that we have produced an apparatus for constructing silo sections embodying the features of advantage enumerated as desirable and we wish it to be understood that while we have illustrated and described what we deem the preferred construction of the apparatus, we reserve the right to make all changes falling within the spirit and scope of the appended claims.

We claim:—

1. In an apparatus for making silo sections, a framework, comprising a pair of parallel beams, cross cleats connecting said beams, supporting members connecting the beams over the cross cleats and having upwardly-bowed edges or surfaces, the ends of the bowed edges or surfaces lying below the plane of the upper edges of said beams, blocks spaced slightly outward from said supporting members and bearing a rigid relation thereto and coöperating with the supporting members and the cross cleats in temporarily supporting bars to constitute cross cleats of a silo section; said bars corresponding in contour to and arranged with their upper edges substantially flush with the upper edges of said supporting members, rods extending transversely of the framework and through the parallel beams thereof, said rods being adapted to fit down upon and conform in curvature to the arched transverse strips resting upon longitudinal staves supported upon the curved edges of the said supporting members, the series of staves abutting together at their side edges, a device secured to and depending from each rod and engaging the outer side of one of the outermost staves, and means for drawing each rod to cause the said device thereof to press the series of staves against the beam most remote from said device and hold them in such position until securing devices can be driven through them and the overlying strip and underlying bar.

2. In an apparatus for making silo sections, a framework comprising a pair of parallel beams, cross cleats connecting said beams, supporting members connecting the beams over the cross cleats and having upwardly-bowed edges or surfaces, the ends of the bowed edges or surfaces lying below the plane of the upper edges of said beams, blocks spaced slightly outward from said supporting members and bearing a rigid relation thereto and coöperating with the supporting members and the cross cleats in temporarily supporting bars to constitute cross cleats of a silo section; said bars corresponding in contour to and arranged with their upper edges substantially flush with the upper edges of said supporting members, rods extending transversely of the framework and through the parallel beams thereof, said rods being adapted to fit down upon and conform in curvature to arched transverse strips resting upon longitudinal staves supported upon the curved edges of the said supporting members, the series of staves abutting together at their side edges, a device secured to and depending from each rod and engaging the outer side of one of the outermost staves, means for drawing each rod to cause the said device thereof to press the series of staves against the beam most remote from said device and hold them in such position until securing devices can be driven through them and the overlying strip and underlying bar, a transverse cleat connecting the beams at an intermediate point with respect to the first-named cleats, pivoted legs depending from the outer sides of said beams, one pair of said legs extending downwardly and outwardly and against one of the endmost cleats, a corresponding pair of legs extending downwardly and outwardly and bearing against the other endmost cleat, and a pair of legs extending convergingly downward and bearing against opposite edges of the intermediate cleat.

In testimony whereof, I affix my signature, in the presence of two witnesses.

ARTHUR C. PORTER.

Witnesses:
J. M. CRUTCHFIELD,
H. R. ENGLISH.

In testimony whereof, I affix my signature, in the presence of two witnesses.

JAMES F. GOODMAN.

Witnesses:
R. E. PATTON,
W. E. WINN.

In testimony whereof, I affix my signature, in the presence of two witnesses.

WILLIAM S. DICKASON.

Witnesses:
LOUIE T. CHICA,
EDWIN H. EWING.